(12) United States Patent
Denis

(10) Patent No.: US 9,915,185 B2
(45) Date of Patent: Mar. 13, 2018

(54) INJECTOR MOUNTING ASSEMBLY

(71) Applicant: Caterpillar Inc., Peoria, IL (US)

(72) Inventor: Andrew M. Denis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 45 days.

(21) Appl. No.: 15/045,364

(22) Filed: Feb. 17, 2016

(65) Prior Publication Data

US 2017/0234194 A1  Aug. 17, 2017

(51) Int. Cl.
*F01N 3/02* (2006.01)
*F01N 5/02* (2006.01)
*F01N 3/20* (2006.01)

(52) U.S. Cl.
CPC ........... *F01N 5/025* (2013.01); *F01N 3/2066* (2013.01); *F01N 2610/11* (2013.01); *F01N 2610/1453* (2013.01)

(58) Field of Classification Search
CPC ................... F01N 5/025; F01N 3/2066; F01N 2610/1453; F01N 2610/11
USPC ......................................................... 60/320
See application file for complete search history.

(56) References Cited

U.S. PATENT DOCUMENTS

| | | | |
|---|---|---|---|
| 6,903,259 B2* | 6/2005 | Ciray | ..................... B01J 8/0278 123/3 |
| 8,978,361 B2 | 3/2015 | Bruck et al. | |
| 2006/0048503 A1 | 3/2006 | Havers | |
| 2008/0193353 A1 | 8/2008 | Hirschberg | |
| 2009/0107120 A1 | 4/2009 | Bruck et al. | |
| 2011/0274590 A1* | 11/2011 | Floyd | ................... F01N 3/2066 422/177 |
| 2014/0261803 A1* | 9/2014 | Wang | ....................... F17D 1/02 137/599.01 |

FOREIGN PATENT DOCUMENTS

| | | |
|---|---|---|
| WO | 2008040363 | 4/2008 |
| WO | 2010142528 | 12/2010 |
| WO | 2014157287 | 10/2014 |

* cited by examiner

*Primary Examiner* — Jason Shanske

(57) ABSTRACT

An injector mounting assembly for supporting an injector is described. The injector mounting assembly includes an upstream wall and a downstream wall coupled to the upstream wall. The injector mounting assembly further includes a thermoelectric cooler coupled to at least one of the upstream wall and the downstream wall. The thermoelectric cooler is disposed in thermal contact with the injector and configured to exchange heat with the injector.

20 Claims, 10 Drawing Sheets

INJECTOR MOUNTING ASSEMBLY

TECHNICAL FIELD

The present disclosure relates to an injector mounting assembly for an exhaust after-treatment system, and more particularly, to an injector mounting assembly having a thermoelectric cooler for cooling an injector mounted thereon.

BACKGROUND

In the last few decades, a significant increase in the number of vehicles has been witnessed. The exhaust gases released by the vehicles are harmful in nature and contribute to the already alarming atmospheric pollution. With the advancement of automobile technology, various after-treatment systems are being introduced in the vehicles for treatment of the exhaust gases before leaving the vehicles. Usually, for the treatment and reduction of the exhaust gases, reductants, such as anhydrous ammonia, aqueous ammonia or urea are introduced into a stream of exhaust gases by using injectors.

Such injectors are usually designed for working within a predefined operating range of temperature. However during operation, the injector may need to be in contact with the exhaust gases for prolonged periods while injecting the reductants. Therefore, the injector may be exposed to high temperature of the exhaust gases, and thus the temperature of the injectors may vary with time. Such variation in temperature may affect the operation of the injector. In case, the injector gets heated to a temperature beyond the predefined operating temperature range, the injector may fail and have to be replaced. Further, overheating of residual fluid within the injector can cause detrimental corrosion or boiling of the residual fluid, which in turn may damage the injector.

Owing to such frequent failure of injectors, the after-treatment system may demand frequent maintenance and consequently, the downtime would be significantly high. Moreover, considering the cost associated with replacement of the injectors, an operational cost of the after-treatment system would increase significantly. Conventional cooling techniques for the injector employ a flow of coolant fluid through an injector mount which can transfer heat away from the injector. However, such arrangement adds to the complexity of the structure and leads to more points of failure. Moreover, some system operating modes may require the injector valve to close for significant time durations, thereby stopping the flow of the fluid through the injector. Accordingly, cooling the injector with the fluid may not be sufficient across all the operating modes for an exhaust after-treatment system.

WIPO Application Number WO2008/040363 A2 (the '363 application) relates to a nozzle for formation and administrating of droplets of a first fluid into a stream of a second fluid. The '363 application relates in particular to a device and a method for controlling the temperature of a nozzle. The '363 application discloses that the nozzle utilized a cooling sleeve which may include one or more Peltier elements for cooling and/or heating the nozzle. However, the '363 application does not talk about any cooling system disposed in an injector mounting assembly itself. The system disclosed in the '363 application may be complicated to implement, and demand a change in construction of the injectors and the after-treatment system for accommodating the system.

SUMMARY OF THE DISCLOSURE

In one aspect of the present disclosure, an injector mounting assembly for supporting an injector and configured for mounting in an exhaust line having an exhaust flow is provided. The injector mounting assembly includes an upstream wall extending at least partially into the exhaust line. The upstream wall is disposed in the exhaust flow. The injector mounting assembly also includes a downstream wall coupled to and located downstream of the upstream wall. The downstream wall extends at least partially into the exhaust line. The downstream wall is disposed in the exhaust flow. The injector mounting assembly further includes a thermoelectric cooler coupled to at least one of the upstream wall and the downstream wall. The thermoelectric cooler is disposed in thermal contact with the injector. The thermoelectric cooler is configured to exchange heat with the injector.

In another aspect of the present disclosure, an exhaust after-treatment system is provided. The exhaust after-treatment system includes an exhaust line with a curved portion and having an exhaust flow. The exhaust after-treatment system also includes an injector mounting assembly mounted in the curved portion. The injector mounting assembly includes an upstream wall extending at least partially into the curved portion. The upstream wall is disposed in the exhaust flow. The injector mounting assembly also includes a downstream wall coupled to and located downstream of the upstream wall. The downstream wall extends at least partially into the curved portion. The downstream wall is disposed in the exhaust flow. The downstream wall includes an interior surface and an exterior surface opposite the interior surface. The downstream wall also includes a plurality of bosses. The injector mounting assembly also includes a recess extending from the downstream wall. The injector mounting assembly also includes a recess aperture formed in the recess. The injector mounting assembly further includes a thermoelectric cooler coupled to the exterior surface of the downstream wall. The thermoelectric cooler is disposed in thermal contact with the injector. The thermoelectric cooler is configured to extract heat from the injector. The exhaust after-treatment system further includes an injector including a nozzle aligned with the recess aperture. The exhaust after-treatment system further includes a plurality of feet. Each of the plurality of bosses extends toward an associated one of the plurality of feet to support the injector in the injector mounting assembly.

In yet another aspect of the present disclosure, an injector mounting assembly for supporting an injector is provided. The injector mounting assembly is configured for mounting in an exhaust line having an exhaust flow. The injector mounting assembly includes a first wall having a first inner surface and a first outer surface. The first inner surface is disposed in thermal contact with the exhaust line. The injector mounting assembly also includes a second wall extending from the first outer surface in a direction away from the exhaust line. The second wall is configured to support the injector. The second wall includes a second inner surface and a second outer surface. The injector mounting assembly further includes a thermoelectric cooler coupled to the second wall. The thermoelectric cooler is disposed in thermal contact with the injector. The thermoelectric cooler is configured to exchange heat with the injector.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
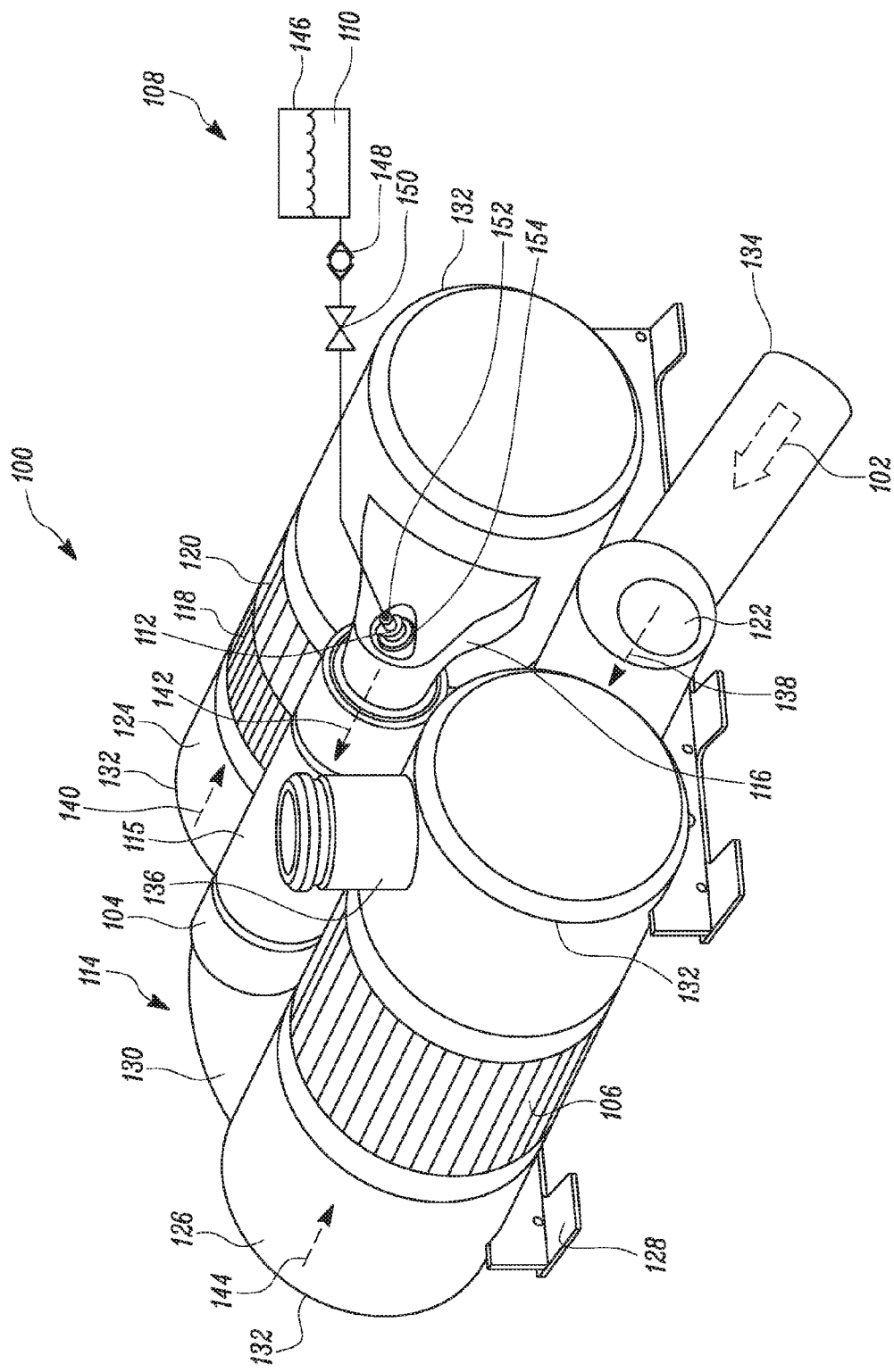
FIG. 1 is a diagrammatic view of an exhaust after-treatment system, according to an embodiment of the present disclosure.

FIG. 1 illustrates an exhaust after-treatment system 100, according to an embodiment of the present disclosure. The exhaust after-treatment system 100 receives an exhaust flow 102 from an engine (not shown) through an exhaust line 104, connecting the engine to the exhaust after-treatment system 100. The engine may be an internal combustion engine, such as, a reciprocating piston engine or a gas turbine engine. The engine may be fueled by gasoline, diesel fuel, biodiesel, alcohol, natural gas, propane, combinations thereof, or any other combustion fuel known in the art. The engine may further be used to power a machine or any other device, including on-highway trucks or vehicles, off-highway trucks or machines, earth moving equipment, generators, aerospace applications, locomotive applications, marine applications, pumps, stationary equipment, or other engine powered applications.

The exhaust flow 102 may contain emission compounds that may include, but not limited to, NOx, unburned hydrocarbons, particulate matter, and other combustion products. The exhaust after-treatment system 100 may be configured to trap or treat NOx, unburned hydrocarbons, particulate matter, and other combustion products present in the exhaust gas flow, before exiting the exhaust after-treatment system 100. The exhaust after-treatment system 100 may include a Selective Catalytic Reduction (SCR) catalyst 106 and a reductant system 108. The SCR catalyst 106 may include a catalyst material disposed on a substrate, which is configured to reduce an amount of NOx in the exhaust flow 102 by using a reductant 110. The substrate may consist of cordierite, silicon carbide, other ceramic, or metal, and may include a plurality of through going channels. In one embodiment, the plurality of through going channels of the substrate may form a honeycomb structure. In one embodiment, the exhaust after-treatment system 100 may also include an Ammonia Oxidation Catalyst (AMOX) (not shown) that may be disposed downstream of the SCR catalyst 106.

Further, the reductant system 108 includes an injector 112 that introduces the reductant 110 into the exhaust flow 102. The injector 112 may be mounted on the exhaust line 104 for introducing the reductants 110 into the exhaust flow 102. In one example, the injector 112 may include springs, washers, injector pins and other features not shown. In one example, urea may be used as the reductant 110. Urea reductant 110 decomposes into ammonia ($NH_3$) that is adsorbed or stored in the SCR catalyst 106. However, the reductant 110 to be used is not limited to urea only, and may include any other suitable chemical known in the art.

The exhaust flow 102 is introduced to the SCR catalyst 106 via an exhaust pipe 114. The exhaust pipe 114 includes a straight portion 115 and a curved portion 116, hereinafter referred to as bend 116, located upstream of the straight portion 115. The injector 112 is mounted in the bend 116. The length of the straight portion 115 or distance between the injector 112 and the SCR catalyst 106 may be sufficiently long to mix the reductant 110 into the exhaust flow 102 and provide a sufficient dwell time for the urea reductant 110 to convert into $NH_3$.

The exhaust after-treatment system 100 may also include a Diesel Oxidation Catalyst (DOC) 118, a Diesel Particulate Filter (DPF) 120, and a clean-up catalyst (not shown) disposed upstream or downstream of the SCR catalyst 106. The DOC 118 may be disposed upstream of the DPF 120, which is upstream of the SCR catalyst 106.

The exhaust after-treatment system 100 may also include a heat source 122 to regenerate the DPF 120. The heat source 122 may embody a burner including a combustion head and a housing to contain a flame. The heat source 122 may also embody an electric heating element, microwave device, or some other heat source. Heat may also be created by injecting a hydrocarbon source, such as fuel, in to the exhaust flow 102 that will exothermically react in the DOC 118. The heat source 122 may also embody operating the engine under conditions to generate elevated temperatures for the exhaust flow 102.

In one example, the DOC 118 and the DPF 120 may be housed in a first canister 124. In other example, the DOC 118 and the DPF 120 may also be housed in separate canisters. Further, the SCR catalyst 106 may be housed in a second canister 126. The first canister 124 and the second canister 126 may be arranged on a mount 128 in a side-by-side parallel orientation. Alternatively, the first canister 124 and the second canister 126 may also be positioned and mounted in other arrangements.

The exhaust line 104 may route the exhaust flow 102 from the first canister 124 into the second canister 126. The exhaust pipe 114 may also include a second bend 130 downstream of the straight portion 115 for routing the exhaust flow 102 into the second canister 126. The first canister 124 and the second canister 126 may also include ends 132 for delivering and receiving the exhaust flow 102. An entering pipe 134 routes the exhaust flow 102 to the exhaust after-treatment system 100. The second canister 126 may further include an exit port 136 for the exhaust flow 102 to exit the exhaust after-treatment system 100. An additional section of the exhaust line 104 may route the exhaust flow 102 from the heat source 122 to the receiving end 132 of the first canister 124.

The exhaust flow 102 passes through the entering pipe 134 and next through the heat source 122, if included, in a first direction 138. Next, the exhaust flow 102 is routed to pass through the first canister 124 in a second direction 140 that may be parallel to the first direction 138. The exhaust flow 102 passes through the DOC 118, DPF 120, end 132, and through the bend 116. Next the exhaust flow 102 passes through the straight portion 115 in a third direction 142 that may be parallel to the second direction 140. Next, the exhaust flow 102 is routed to pass through the second bend 130 and through the second canister 126 in a fourth direction 144 that may be parallel to the second direction 140. Finally the exhaust flow 102 exits through the exit port 136.

In one example, the reductant system 108 may also include a reductant source 146, a pump 148, and a valve 150. The reductant 110 may be drawn from the reductant source 146 via the pump 148, and may then be delivered to an inlet connection 152 on the injector 112. The valve 150 or the pump 148 may be used to control the delivery of the reductant 110. In one embodiment, the exhaust after-treatment system 100 may include a controller (not shown) and sensors (not shown) for controlling the reductant system 108. The controller may also be in communication with an engine control module (ECM) (not shown).

For supporting the injector 112 on the exhaust line 104, an injector mounting assembly 154, such as an indentation, is disposed on the exhaust line 104. The injector mounting assembly 154 and the positioning of the injector mounting assembly 154 on the exhaust line 104 are explained in detail in the description of subsequent figures.

Figure 2:
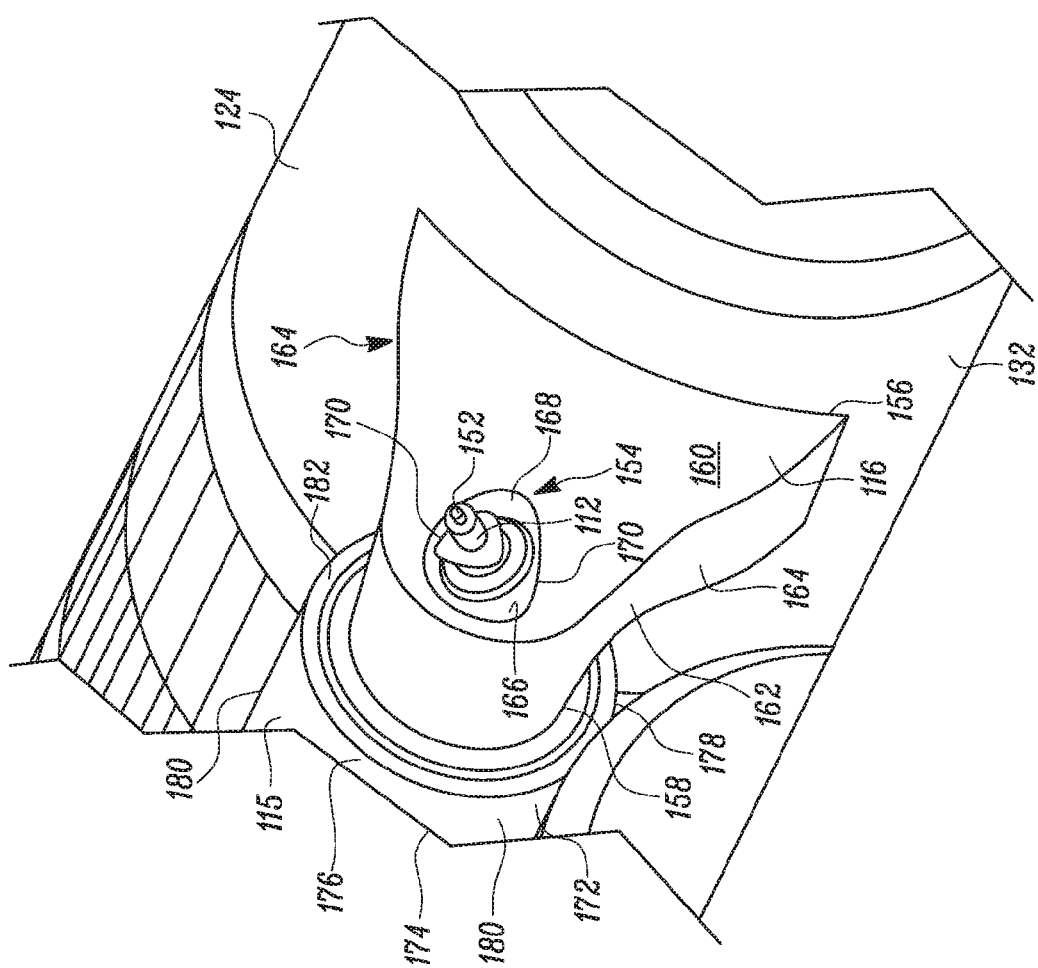
FIG. 2 is an enlarged diagrammatic view of a curved portion of an exhaust pipe used in the exhaust after-treatment system of FIG. 1, according to an embodiment of the present disclosure.

As best shown in FIG. 2, the bend 116 includes a bend inlet end 156, a bend outlet end 158, a bend outer curve 160, a bend inner curve 162, and bend sides 164. The bend outer curve 160, the bend inner curve 162, and the bend sides 164 form a bent tube or box structure with an open bend inlet end 156 and the bend outlet end 158. The bend inlet end 156 joins to and is in fluid communication with the end 132 of the first canister 124. The bend outlet end 158 joins to and is in fluid communication with the straight portion 115. The bend outer curve 160, the bend inner curve 162, and the bend sides 164 represent walls exposed to the exhaust flow 102.

The injector mounting assembly 154 may be included in the bend outer curve 160. The injector mounting assembly 154 is defined by or includes a downstream wall 166, an upstream wall 168, and sidewalls 170, which together form a recessed pocket or area in the bend 116. The injector mounting assembly 154 may have rounded triangular shape with a width at one end greater than a width at the other end. The injector mounting assembly 154 may also have other shapes, including rectangular, cylindrical, or hemispherical.

The straight portion 115 includes an upstream end 172, a downstream end 174, an outer wall 176, an inner wall 178, and sides 180 to form a tubular pipe. The straight portion 115, and other components, may be wrapped in insulation 182. The upstream end 172 joins to the bend outlet end 158.

Figure 3:
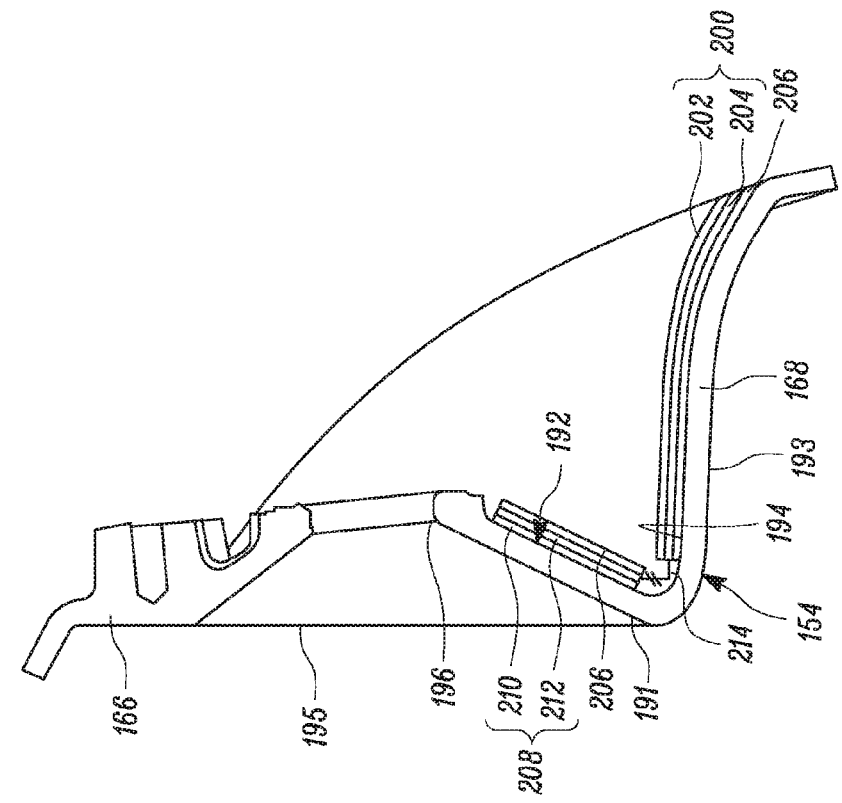
FIG. 3 is a diagrammatic side elevation view, in cross-section, of an injector mounting assembly, with an injector, provided in the curved portion of the exhaust pipe, according to an embodiment of the present disclosure.
Figure 4:
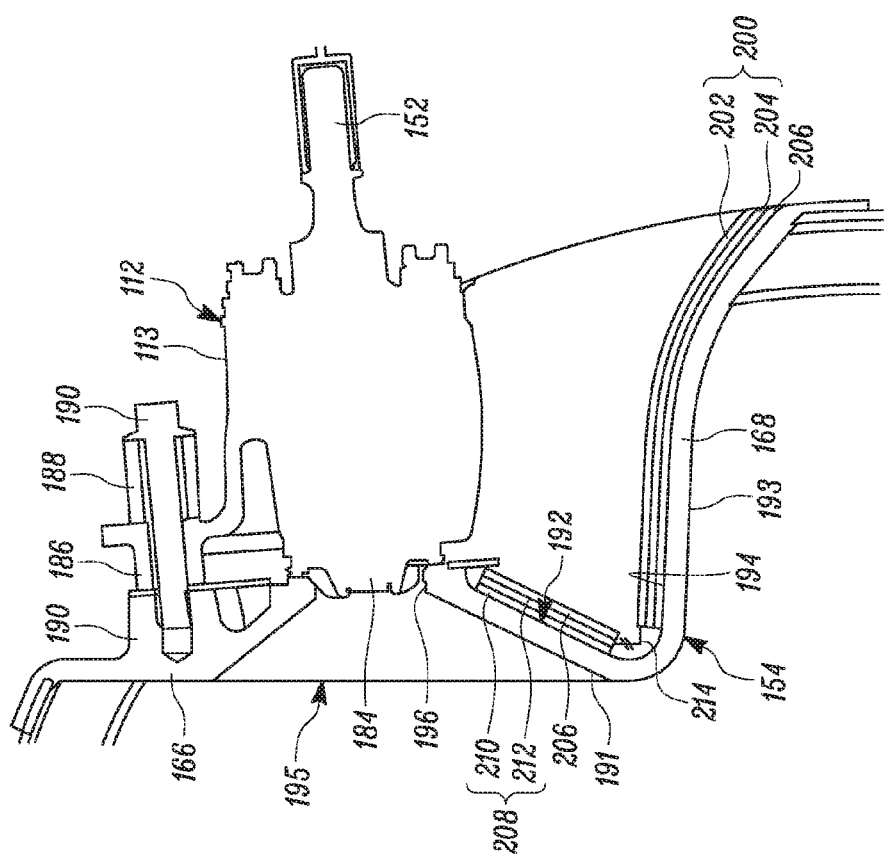
FIG. 4 is a diagrammatic side elevation view, in cross-section, of the injector mounting assembly, according to an embodiment of the present disclosure.

Further referring to FIGS. 3-4, a front end of the injector 112 may include a nozzle 184 for discharging the reductant 110. The front end of the injector 112 may further include a plurality of feet 186 which permit the injector 112 to be removably coupled to the injector mounting assembly 154 using washers 188 and fasteners 190. The feet 186 may terminate at a plane that is positioned adjacent the nozzle 184. The reductant inlet connection 152 is positioned opposite the nozzle 184 at a back end of the injector 112.

Also, as illustrated, the downstream wall 166 includes an interior surface 191 facing toward the bend outlet end 158 and an opposite exterior surface 192. Further, the upstream wall 168 includes an interior surface 193 and an opposite exterior surface 194. A recess 195 is formed in the downstream wall 166 that extends away from the bend outlet end 158, and a recess aperture 196 is formed in a center of the recess 195 for fluid communication with the nozzle 184. In one example, the recess 195 may have a substantially obround shape to reduce recirculation flow.

In operation, the injector 112 may be disposed in fluid communication with the exhaust line 104. The injector 112 may be configured to supply the reductant 110 to the exhaust flow 102 through the recess 195. The reductant 110 may then enter the exhaust line 104 and travel along with the exhaust flow 102 in the exhaust line 104.

Figure 5:
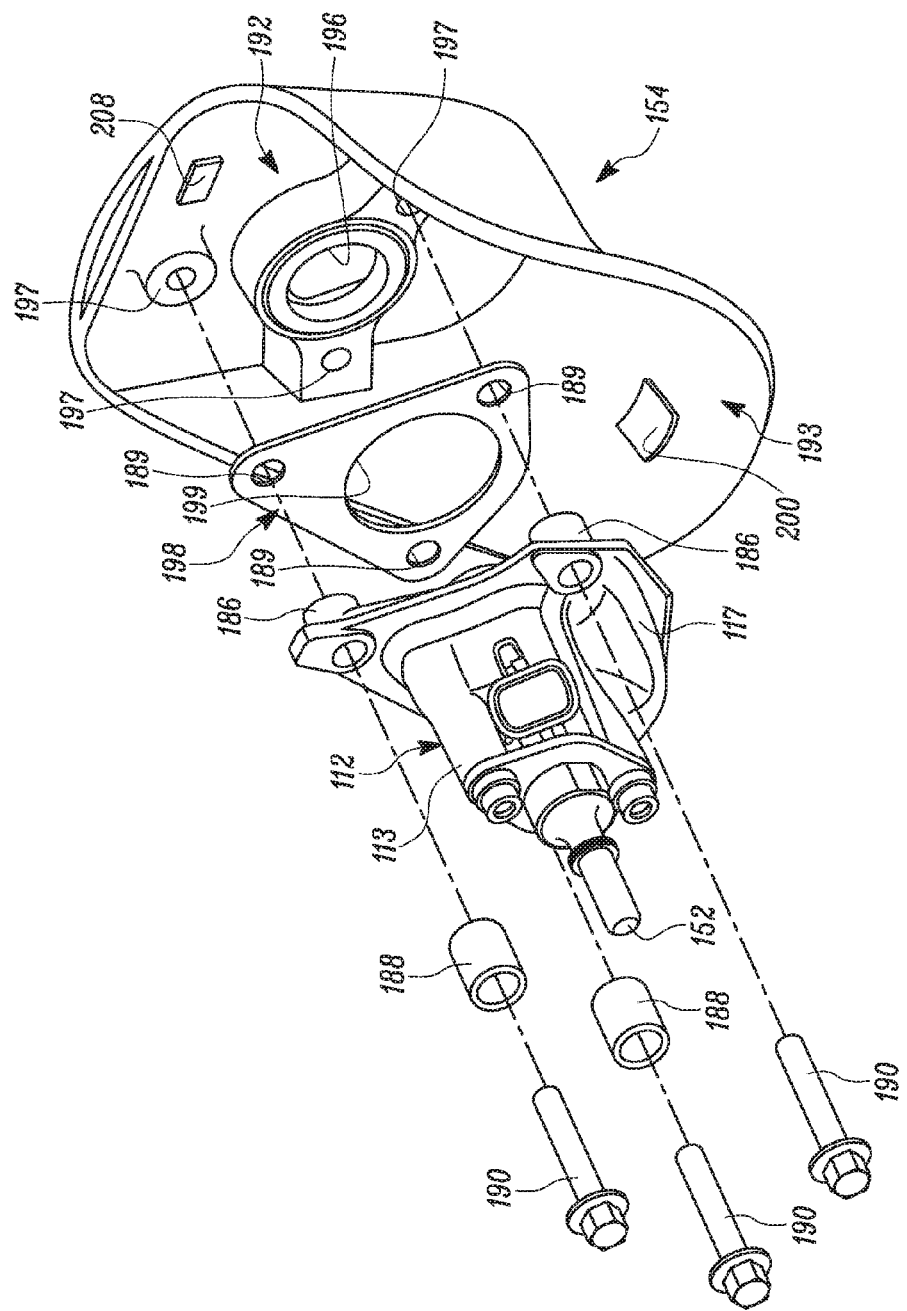
FIG. 5 is an exploded view of the injector mounting assembly along with the injector, according to an embodiment of the present disclosure.

The injector 112 may be removably coupled with the injector mounting assembly 154. As best shown in FIG. 5, the injector 112 includes an outer wall 113 and a base 117, defining the body of the injector 112. The exterior surfaces 192 of the downstream wall 166, in the injector mounting assembly 154, may include a plurality of mounting bosses 197 positioned to abut the feet 186 of the injector 112. An optional gasket 198 may be disposed between the feet 186 and the mounting bosses 197 to further insulate the injector 112 from heat when coupled to the injector mounting assembly 154. The gasket 198 may include a gasket aperture 199 substantially aligned with the recess aperture 196 and a plurality of fastener apertures 189 sized to receive the fasteners 190.

In an embodiment of the present disclosure, the injector mounting assembly 154 may include one or more thermoelectric coolers 200. As is generally known, the thermoelectric coolers operate based on the principle of Peltier effect. A thermo-cooler includes a pair of electrodes that are typically made of metal with good electrical conductivity. When an electric current is passed through the thermoelectric cooler, the heat is transferred from a first electrode to a second electrode. As a result, the first electrode gets cooler while increasing the temperature of the second electrode, and thus the thermoelectric cooler has a cold side and a hot side, typically opposite to each other. Depending on the requirement one of the sides may be disposed in thermal contact with a body to either cool or heat that body. The term "thermal contact" referred herein implies that the two bodies may not be in physical contact but still have a heat exchange relationship, via radiation phenomenon. In the present embodiment, the injector mounting assembly 154 may include the thermoelectric cooler 200 to extract heat from the injector 112.

FIGS. 6-11 illustrate simplified representations of an exemplary injector mounting assembly 300 with an exemplary injector 301 coupled therewith. These illustrations are for reference only and have been included to show the possible locations for the thermoelectric cooler 200 to be coupled in the injector mounting assembly 300 for optimum heat extraction from the injector 301. As illustrated, the injector mounting assembly 300 may include a first wall 302 and a second wall 304. The first wall 302 may further include a first inner surface 306 and a first outer surface 308. As the injector mounting assembly 300 is mounted on the exhaust line 104, the first inner surface 306 may be disposed in thermal contact with the exhaust line 104. The second wall 304 of the injector mounting assembly 300 may extend from the first outer surface 308 of the first wall 302 in a direction away from the exhaust line 104, defining a bore. Further, the second wall 304 may include a second inner surface 310 and a second outer surface 312.

As the injector mounting assembly 300 is mounted on the exhaust line 104, the first inner surface 306 of the first wall 302 is in thermal contact with the exhaust flow 102. The injector 301 may be supported within the bore, as defined by the second wall 304. The second wall 304 may support the injector 301 in such a manner that the second inner surface 310 may maintain a thermal contact with the injector 301, that is the second inner surface 310 may be in a heat exchange relationship with the injector 301.

Figure 6:
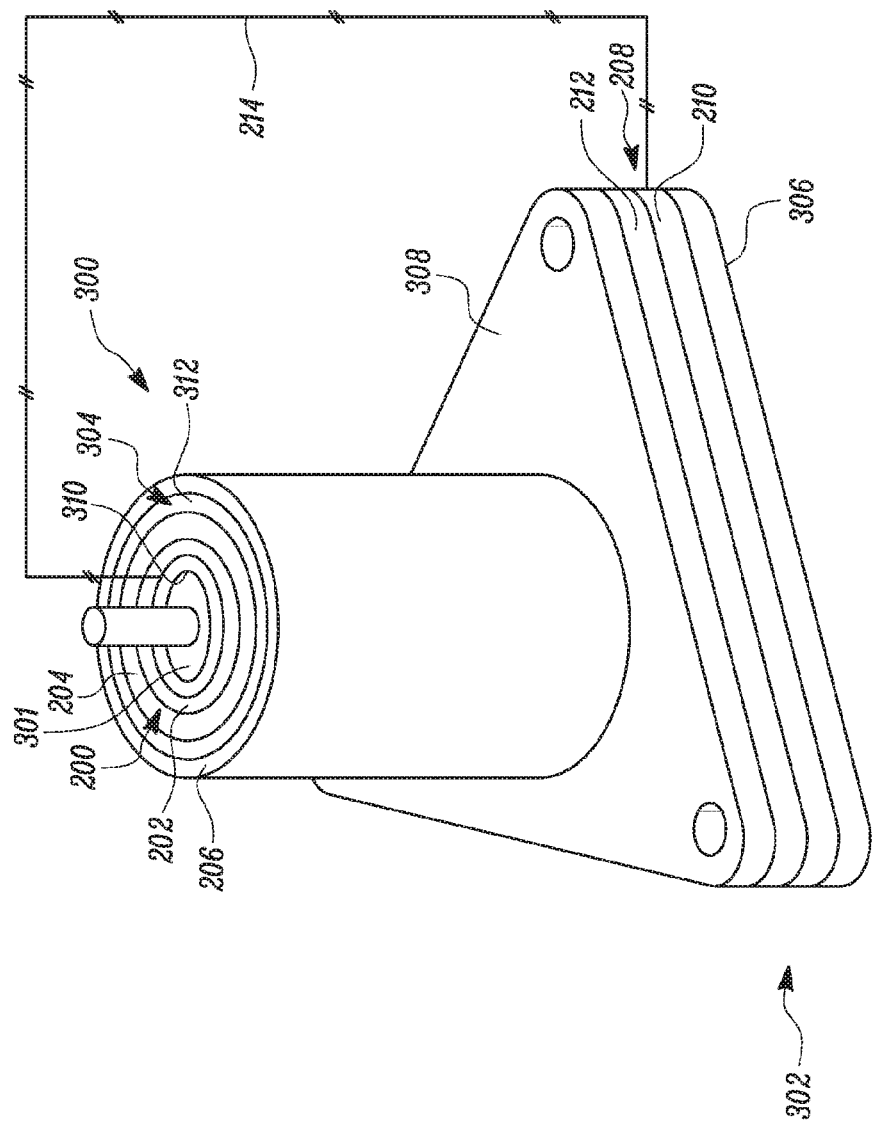
FIG. 6 is a perspective view of an injector mounting assembly, according to another embodiment of the present disclosure.
Figure 7:
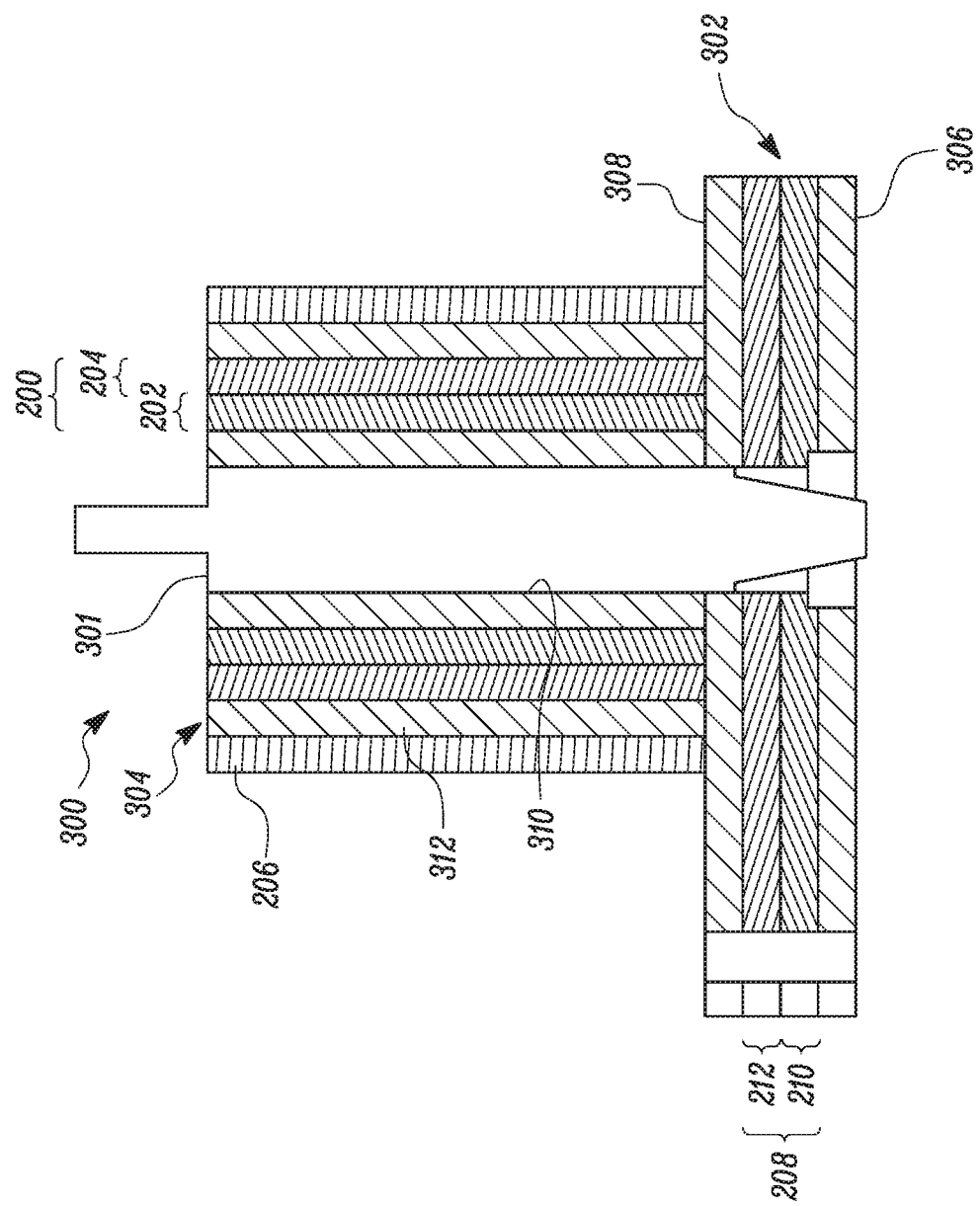
FIG. 7 is a sectional view of the injector mounting assembly of FIG. 6, according to another embodiment of the present disclosure.

In one example, as illustrated in FIGS. 6-7, the thermoelectric cooler 200 may be formed integrally with the second wall 304. In other words, the thermoelectric cooler 200 may be disposed within the second wall 304 of the injector mounting assembly 300. As a result, the entire second wall 304 may extract heat from the injector 301 in thermal contact therewith. In the illustrated example, a cold side 202 of the thermoelectric cooler 200 may be disposed so as to maintain a thermal contact with the second inner surface 310. Further, the hot side 204 of the thermoelectric cooler 200 may be disposed so as to maintain a thermal contact with the second outer surface 312. Therefore, the cold side 202 may extract the heat from the injector 301 via the second inner surface 310. Further, the hot side 204 may transfer some of the heat generated during the operation to the second outer surface 312. In some examples, the injector mounting assembly 300 may also include a heat sink 206 disposed in thermal contact with the second outer surface 312. In one example, the heat sink 206 may envelop the second outer surface 312. The extracted heat from the second outer surface 312 may be dissipated into the atmosphere via the heat sink 206, thus cooling the injector 301.

In order to ensure continuous cooling of the injector 301, the thermoelectric cooler 200 have to be continuously supplied with electric power. In one example, the injector mounting assembly 300 may include a power source (not shown), such as a battery, to provide electric current to the thermoelectric cooler 200. In other examples, the injector mounting assembly 300 may include a thermoelectric generator 208 configured to generate electric current using the heat from the exhaust flow 102, and the thermoelectric cooler 200 may be powered by the electric current generated by the thermoelectric generator 208.

In one example, the thermoelectric generator 208 may be integrally formed with the first wall 302. The thermoelectric generator 208 may include a heat absorbing side 210 and a heat delivery side 212. The heat absorbing side 210 may be disposed so as to maintain a thermal contact with the first inner surface 306 of the first wall 302. Similarly, the heat delivery side 212 may be disposed so as to maintain a thermal contact with the first outer surface 308 of the first wall 302. In operation, the heat absorbing side 210 may absorb the heat from the exhaust flow 102, via the first inner surface 306. The absorbed heat may create a temperature difference between the heat absorbing side 210 and the heat delivery side 212. This temperature difference may generate the electric current in the thermoelectric generator 208.

In one example, the generated electric current, by the thermoelectric generator 208, may be transmitted to the thermoelectric cooler 200, via an electric connection 214. The electric connection 214 may be a hard-wire connection between the thermoelectric generator 208 and the thermoelectric cooler 200. The electric current, from the thermoelectric generator 208, may be used to power the thermoelectric cooler 200 for extracting heat from the injector 301 positioned within the second wall 304.

It may be contemplated that the functions of the thermoelectric cooler 200 and the thermoelectric generator 208 may be switched based on the positioning of their respective cold sides and hot sides. Further, it may be contemplated that the hot side 204 of the thermoelectric cooler 200 may be disposed in thermal contact with the injector 301, so that the thermoelectric cooler 200 may heat the injector 301, as may be required sometimes for heating the urea reactant 110 or some other purposes.

Figure 8:
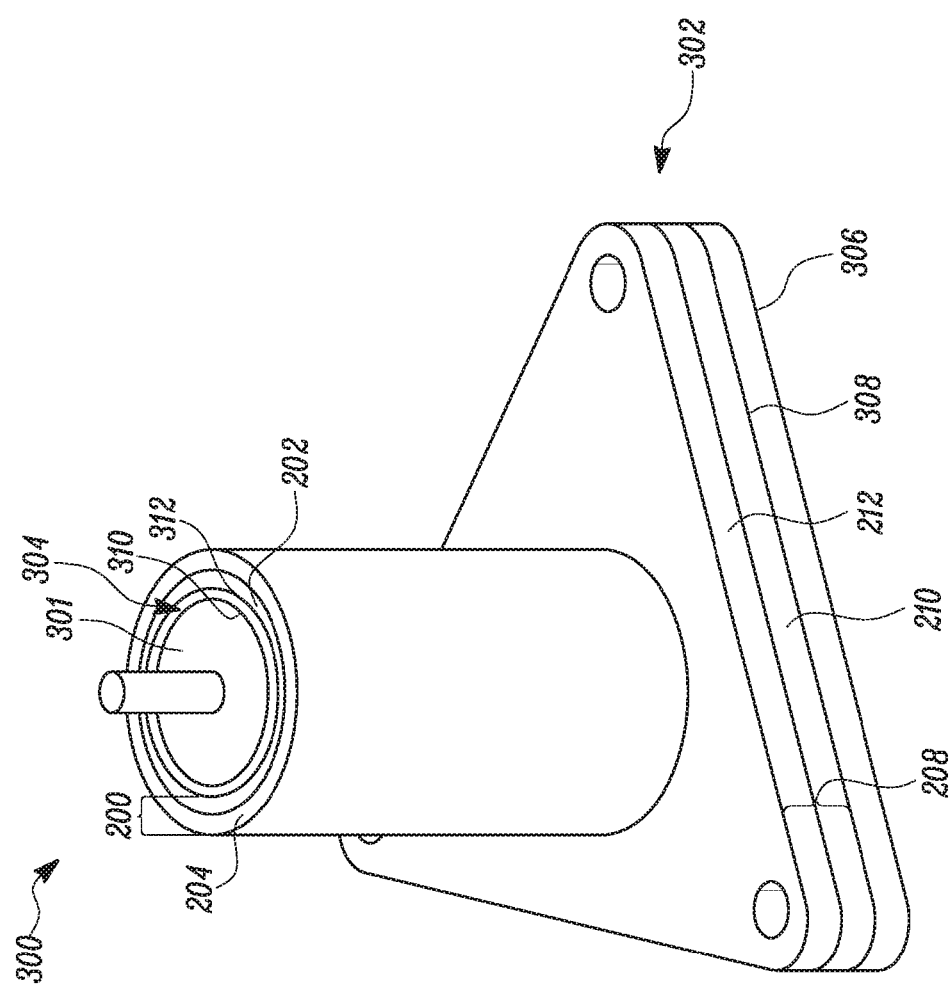
FIG. 8 is a perspective view of an injector mounting assembly, according to still another embodiment of the present disclosure.
Figure 9:
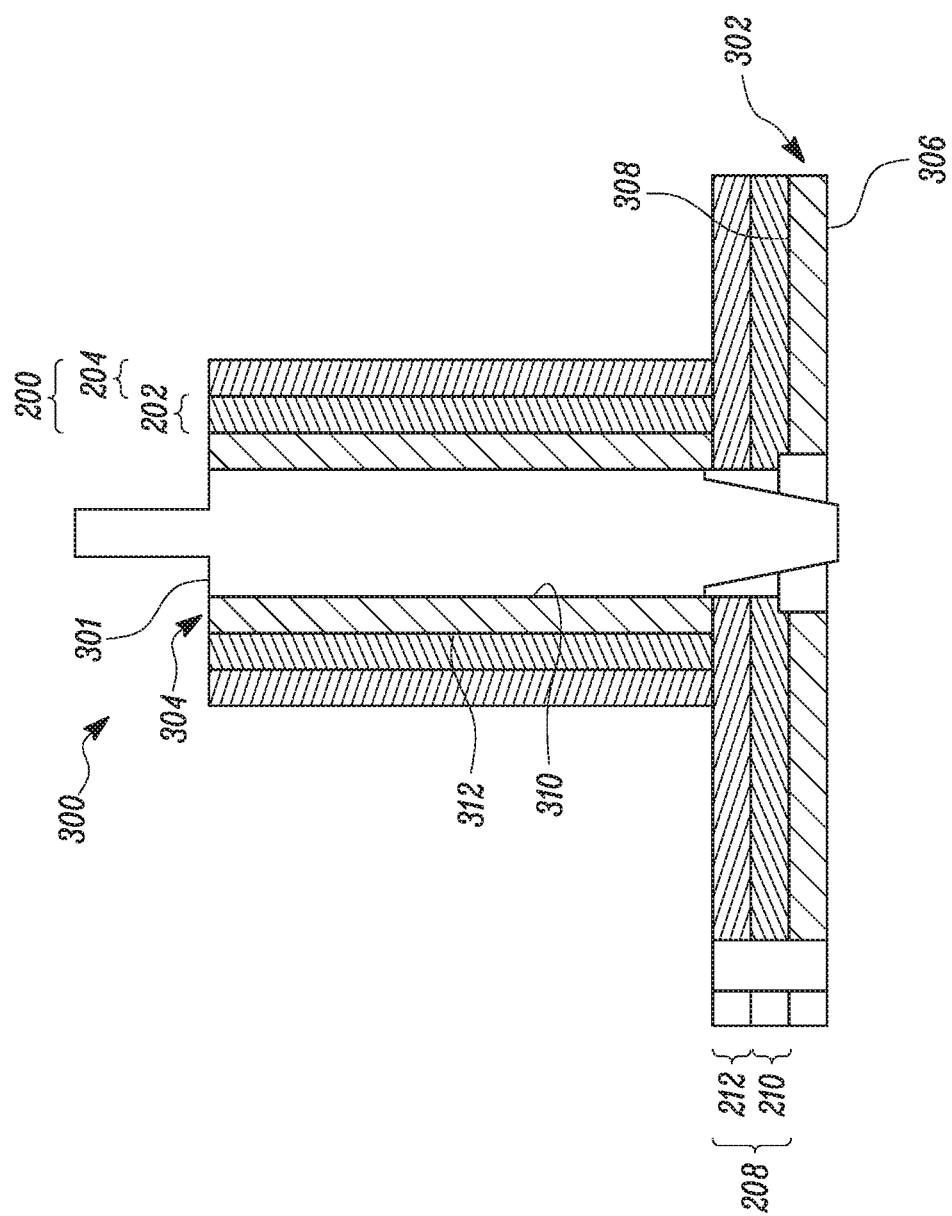
FIG. 9 is a sectional view of the injector mounting assembly of FIG. 8, according to still another embodiment of the present disclosure.

In other example, as illustrated in FIGS. 8-9, the thermoelectric cooler 200 may be coupled to the second wall 304, in such a manner that the cold side 202 is in direct contact with the second outer surface 312. In operation, the cold side 202 may extract heat from the injector 301, via the second wall 304. It may be understood that the second wall 304 may be made of any suitable thermally conducting material. Further, the extracted heat may indirectly be dissipated by the hot side 204, with or without the heat sink 206, thus cooling the injector 301. Further, FIGS. 8-9 show another configuration for mounting the thermoelectric generator 208 to the first wall 302. The thermoelectric generator 208 may be coupled in such a manner that the heat absorbing side 210 is in direct contact with the first outer surface 308 of the first wall 302.

Figure 10:
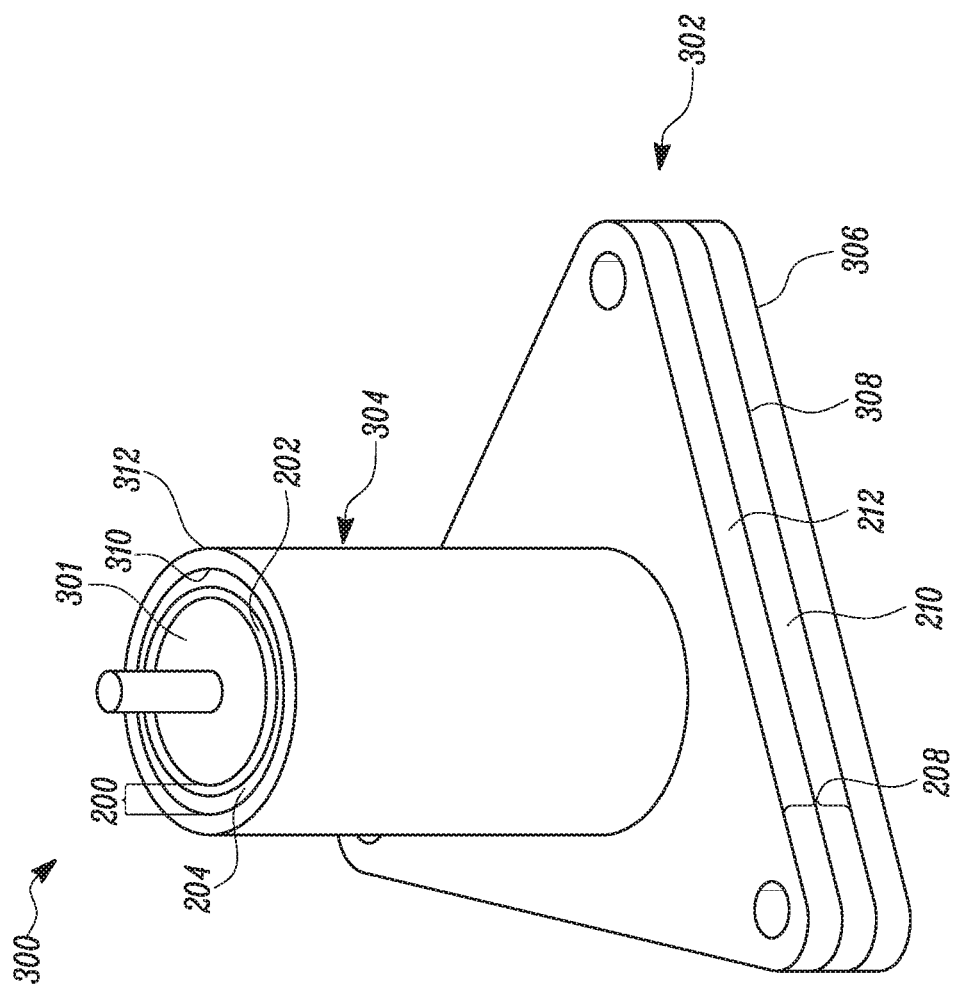
FIG. 10 is a perspective view of an injector mounting assembly, according to yet another embodiment of the present disclosure.
Figure 11:
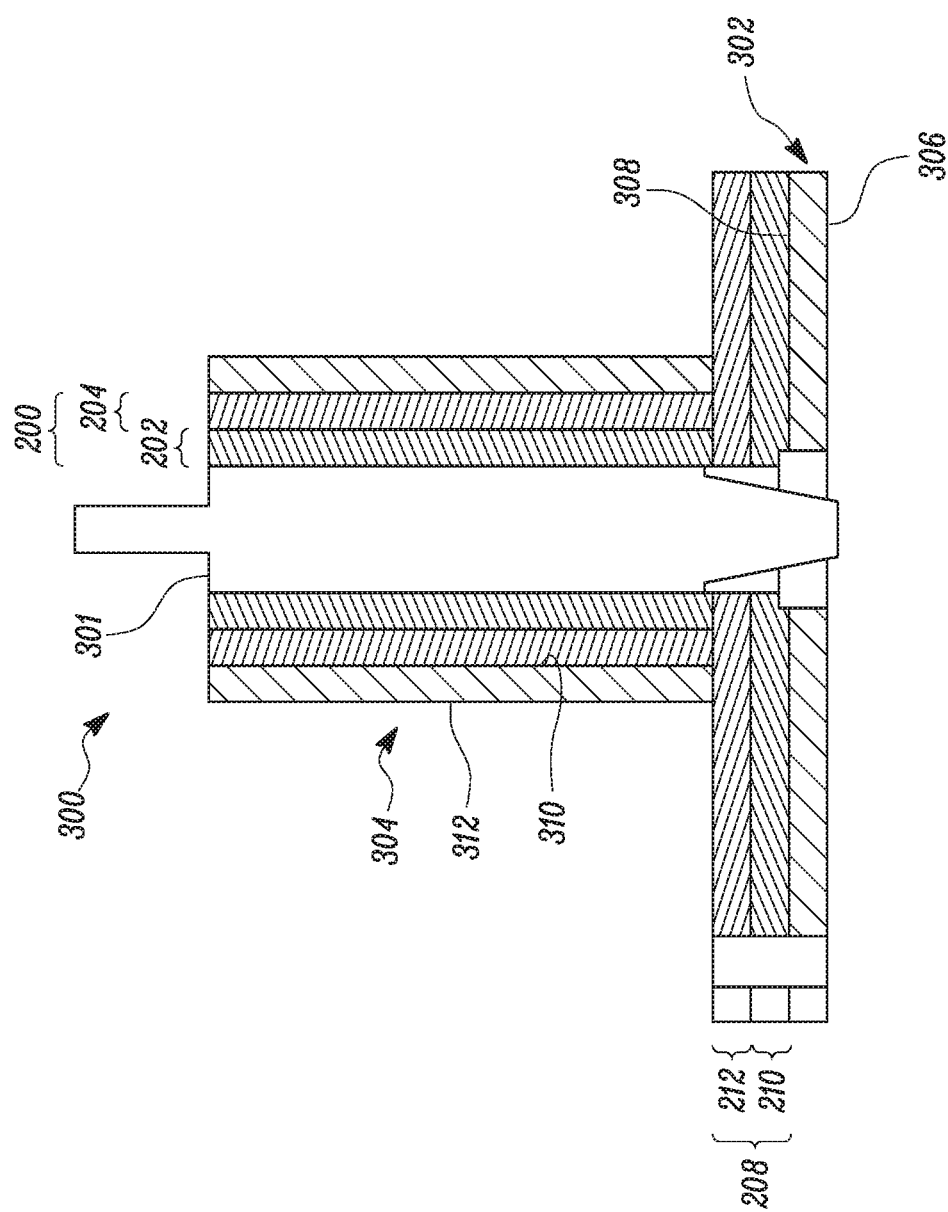
FIG. 11 is a sectional view of the injector mounting assembly of FIG. 10, according to yet another embodiment of the present disclosure.

In yet another example, as illustrated in FIGS. 10-11, the thermoelectric cooler 200 may be coupled to the second wall 304. The thermoelectric cooler 200 may be coupled in such a manner that the cold side 204 is in direct contact with the injector 301, and the hot side 204 may be in direct contact with the second inner surface 310.

Referring back to embodiment of the injector mounting assembly 154, as illustrated in FIGS. 1-5, in one example, the thermoelectric cooler 200 may be coupled along the exterior surface 194 of the upstream wall 168. As best seen in FIGS. 3-4, the thermoelectric cooler 200 may be lined-up along the exterior surface 194. In other examples, the thermoelectric cooler 200 may be in the form of patches disposed along the exterior surface 194. In both cases the thermoelectric cooler 200 may be in thermal contact with the injector 112. In particular, the cold side 202 of the thermoelectric cooler 200 may be in thermal contact with the injector 112 while the hot side 204 may be in thermal contact with the exterior surface 194. Similarly, the thermoelectric cooler 200 may also be coupled with the exterior surface 192 of the downstream wall 166 to provide additional cooling for the injector 112, not shown in the embodiment of the injector mounting assembly 154. Further, in one example, the injector mounting assembly 154 may include the heat sink 206 disposed between the hot side 204 and the exterior surface 194.

In some other examples, as best illustrated in FIGS. 3-4, the exterior surface 192 of the downstream wall 166 may be lined with the thermoelectric generator 208. Specifically, the heat absorbing side 210 may be placed in thermal contact with the exterior surface 192. The thermoelectric generator 208 may generate electric current using the heat absorbed from the exhaust flow 102 via the downstream wall 166, and utilize that electric current to power the thermoelectric cooler 200, via the electric connection 214, disposed along the upstream wall 168 or any other location in the injector mounting assembly 154. The electric connection 214 may be in the form of a conducting wire, or preferably a conducting layer embedded in the walls of the injector mounting assembly 154.

In an alternate embodiment, the thermoelectric cooler 200 may be placed in direct contact with the injector 112. Specifically, the cold side 202 may be in thermal contact with the outer wall 113 of the injector 112. Further, in one example, the thermoelectric generator 208 may be placed with the injector 112. Specifically, the heat absorbing side 210 may be placed in thermal contact with the base 117 of the injector 112, to absorb heat from the exhaust flow 102 via the downstream wall 166 and any gasket 198 in between.

It may be understood that the thermoelectric coolers 200 comes in different sizes and capacity. The illustrated shapes, sizes and locations of the thermoelectric cooler 200 and the thermoelectric generator 208 are for reference only, and may be changed based on the design requirements and space constrains in the injector mounting assembly 154. Further, in some cases, the injector mounting assembly 154 may utilize more than one thermoelectric cooler 200 based on the cooling requirement of the injector 112. In one example, the injector mounting assembly 154 may include two or more thermoelectric coolers 200 stacked on top of each other to provide the required cooling capacity.

It is calculated that the thermoelectric cooler 200 requires about 100 watts of power for cooling a typical injector 112 of the exhaust after-treatment system 100. The said power may be provided by an external power source or the thermoelectric generator 208, as discussed. It may be contemplated by a person skilled in the art that multiple thermoelectric generators 208 may be employed to generate the required power, and these thermoelectric generators 208 may be arranged in a stacked manner or any other suitable configuration.

In an embodiment of the present disclosure, the injector mounting assembly 154 may be manufactured by embedding the thermoelectric cooler 200 therein. The thermoelectric cooler 200 may be embedded to a particular section or the entire exterior surface 192 and/or exterior surface 194. The thermoelectric cooler 200 may be embedded to the desired walls of the injector mounting assembly 154 by using layered manufacturing (LM) techniques. Among the layered manufacturing techniques are the photo-polymerization (stereo-lithography SLA), the ink-jet-printing (IJP), the 3D-printing (3DP), the fused deposition modeling (FDM), the selective laser sintering (SLS) and selective laser melting (SLM), as well as the selective electron-beam-melting (EBM). Also laminated object manufacturing (LOM), laser cladding (LC) can be employed. The layered manufacturing technique provides flexibility to embed the thermoelectric cooler 200 along contoured walls and yet provide the necessary mechanical strength. In another embodiment, the thermoelectric cooler 200 may be embedded to the walls of the injector mounting assembly 154 by using conventional molding or stamping techniques. These conventional techniques make the thermoelectric cooler 200 a part of the walls of the injector mounting assembly 154 and therefore reduce chances of developing any stress areas because of the embedding of the thermoelectric cooler 200. The process or technique for embedding may be selected based on the design requirements of the injector mounting assembly 154.

INDUSTRIAL APPLICABILITY

The present disclosure relates to the injector mounting assembly 154 for the injector 112 of the exhaust after-treatment system 100. The injector mounting assembly 154 may be removably coupled with the exhaust line 104. The injector mounting assembly 154 may support the injector 112 for introducing the reductant 110 into the exhaust flow 102, in the exhaust line 104. During operation, the injector 112 gets exposed to the hot exhaust flow 102 which heats up the injector 112. In some cases, the temperature of the injector 112 may exceed the recommended operating temperature, which increases the probability of the failure of the component.

The injector mounting assembly 154 of the present disclosure with the thermoelectric cooler 200 offers a convenient method for cooling the injector 112 of the exhaust after-treatment system 100. The integration of the thermoelectric cooler 200 with the injector mounting assembly 154 is an effective technique of cooling the injector 112 without making any significant changes to other components of the exhaust after-treatment system 100. The use of the thermoelectric cooler 200 may eliminate the need for installation and maintenance of an additional coolant line just for the purpose of cooling the injector 112. Consequently, cost, failure probability and design complexities related to the installation and maintenance of the injector coolant arrangements may also be reduced.

The present disclosure also provides the thermoelectric generator 208 which may be coupled with the injector mounting assembly 154 and be used to power the thermoelectric cooler 200 arranged therewith. This makes the injector mounting assembly 154 a standalone unit, at least in terms of power requirement, and thus eliminating the need to route long electric wires to supply the required power. Therefore, the use of thermoelectric generator 208 reduces the complexity in design of the injector mounting assembly 154, and, in general, the exhaust after-treatment system 100. Further, the use of thermoelectric generator 208 makes the unit more power efficient as a whole, which in turn increases the efficiency of the engine associated therewith.

The present disclosure provides multiple arrangements for coupling the thermoelectric cooler 200 with the injector mounting assembly 154 to suit the requirements of construction and installation of the injector mounting assembly 154, and, in general, the exhaust after-treatment system 100. Further, the present disclosure provides flexibility with regard to the construction, installation and functioning of the thermoelectric cooler 200 in the injector mounting assembly 154. Therefore, the present disclosure offers an effective, easy, productive, flexible, time-saving, convenient, and cost-effective injector mounting assembly 154 for supporting the injector 112.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. An injector mounting assembly for supporting an injector and configured for mounting in an exhaust line having an exhaust flow, the injector mounting assembly comprising:
   an upstream wall extending at least partially into the exhaust line and disposed in the exhaust flow;

a downstream wall coupled to and located downstream of the upstream wall, the downstream wall extending at least partially into the exhaust line and disposed in the exhaust flow; and a thermoelectric cooler coupled to at least one of the upstream wall and the downstream wall, the thermoelectric cooler disposed in thermal contact with the injector and configured to exchange heat therewith.

2. The injector mounting assembly of claim 1, wherein the thermoelectric cooler is configured to extract heat from the injector.

3. The injector mounting assembly of claim 1, wherein the thermoelectric cooler includes a cold side and a hot side, and wherein the cold side is disposed in thermal contact with the injector.

4. The injector mounting assembly of claim 1, wherein the upstream wall includes an interior surface facing the exhaust line and an exterior surface opposite to the interior surface, and wherein the thermoelectric cooler is coupled to the exterior surface of the upstream wall.

5. The injector mounting assembly of claim 1 further comprising: a thermoelectric generator, wherein the thermoelectric generator is configured to absorb heat from the exhaust flow to generate an electric current, and wherein the generated electric current is used to power the thermoelectric cooler.

6. The injector mounting assembly of claim 1, wherein the thermoelectric generator is coupled to the downstream wall.

7. The injector mounting assembly of claim 1, wherein the thermoelectric cooler is embedded in the upstream wall.

8. The injector mounting assembly of claim 7, wherein the thermoelectric cooler is embedded in the upstream wall by a layer manufacturing technique.

9. The injector mounting assembly of claim 1, wherein the thermoelectric cooler is integral to the upstream wall.

10. The injector mounting assembly of claim 9, wherein the thermoelectric cooler is formed with the upstream wall by a molding or a stamping process.

11. An exhaust after-treatment system comprising:
an exhaust line with a curved portion and having an exhaust flow;
an injector mounting assembly formed in the curved portion, the injector mounting assembly comprising:
an upstream wall extending at least partially into the curved portion and disposed in the exhaust flow, the upstream wall having an interior surface and an exterior surface opposite the interior surface;
a downstream wall coupled to and located downstream of the upstream wall, the downstream wall extending at least partially into the curved portion and disposed in the exhaust flow, the downstream wall including a plurality of bosses;
a recess extending from the downstream wall;
a recess aperture formed in the recess; and
a thermoelectric cooler coupled to the exterior surface of the upstream wall; and
an injector including a nozzle, aligned with the recess aperture, and a plurality of feet, wherein each of the plurality of bosses extends toward an associated one of the plurality of feet to support the injector in the injector mounting assembly;
wherein the thermoelectric cooler is disposed in thermal contact with the injector to exchange heat therewith.

12. The injector mounting assembly of claim 11, wherein the thermoelectric cooler includes a cold side and a hot side, and wherein the cold side is disposed in thermal contact with the injector to extract heat therefrom.

13. The injector mounting assembly of claim 11 further comprising: a thermoelectric generator coupled to the downstream wall, wherein the thermoelectric generator is configured to absorb heat from the exhaust flow to generate an electric current, and wherein the generated electric current is used to power the thermoelectric cooler.

14. The injector mounting assembly of claim 11, wherein the thermoelectric cooler is embedded in the upstream wall by a layer manufacturing technique.

15. The injector mounting assembly of claim 11, wherein the thermoelectric cooler is integrally formed with the upstream wall by a molding or a stamping process.

16. An injector mounting assembly for supporting an injector and configured for mounting in an exhaust line having an exhaust flow, the injector mounting assembly comprising:
a first wall having a first inner surface and a first outer surface, the first inner surface disposed in thermal contact with the exhaust line;
a second wall extending from the first outer surface in a direction away from the exhaust line and configured to support the injector, the second wall having a second inner surface and a second outer surface; and
a thermoelectric cooler coupled to the second wall and disposed in thermal contact with the injector, the thermoelectric cooler configured to exchange heat with the injector.

17. The injector mounting assembly of claim 16, wherein the thermoelectric cooler includes a cold side and a hot side, and wherein the thermoelectric cooler is configured to extract heat from the injector via the cold side.

18. The injector mounting assembly of claim 17, wherein the thermoelectric cooler is coupled to the second wall such that the cold side is in thermal contact with the second outer surface.

19. The injector mounting assembly of claim 17, wherein the thermoelectric cooler is coupled to the second wall such that the cold side is in thermal contact with the injector and the hot side is in thermal contact with the second inner surface.

20. The injector mounting assembly of claim 16 further comprising a thermoelectric generator coupled to the first wall, wherein the thermoelectric generator is configured to absorb heat from the exhaust flow via the first inner surface of the first wall to generate an electric current, and wherein the generated electric current is used to power the thermoelectric cooler.

* * * * *